V. L. EMERSON.
METHOD OF PRODUCING MACHINE ELEMENTS.
APPLICATION FILED MAR. 31, 1917.

1,297,129.

Patented Mar. 11, 1919.
2 SHEETS—SHEET 1.

Inventor
Victor Lee Emerson
By his Attorney
Lawrence S. Paddock

V. L. EMERSON.
METHOD OF PRODUCING MACHINE ELEMENTS.
APPLICATION FILED MAR. 31, 1917.

1,297,129.

Patented Mar. 11, 1919.
2 SHEETS—SHEET 2.

Inventor
Victor Lee Emerson
By his Attorney
Lawrence S. Paddock

UNITED STATES PATENT OFFICE.

VICTOR LEE EMERSON, OF PHILADELPHIA, PENNSYLVANIA.

METHOD OF PRODUCING MACHINE ELEMENTS.

1,297,129.        Specification of Letters Patent.      Patented Mar. 11, 1919.

Original application filed February 10, 1916, Serial No. 77,528. Divided and this application filed March 31, 1917. Serial No. 159,384.

*To all whom it may concern:*

Be it known that I, VICTOR LEE EMERSON, a citizen of the United States of America, residing at No. 6381 Overbrook avenue, city of Philadelphia, county of Philadelphia, State of Pennsylvania, have invented a new and useful Improvement in Methods of Producing Machine Elements, of which the following is a specification.

This invention relates broadly to the production of an article of manufacture for the purpose described by the employment of a process which combines methods of manufacture, which lend themselves to the production of a superior article in a more efficient, economical and cheaper way than has heretofore been produced.

This application is a division of applicant's application Serial No. 77,528, filed February 10, 1916, for a machine element.

In accordance with the above object and by way of example the present invention may more specifically consist in forming one portion of a universal coupling of drawn sheet metal; machining another from bar stock and uniting the two by suitable means, such as welding, which enables each part to be treated so as to attain the desired qualities, which could not be done in an economical or practical manner with a single piece of material.

Another object of this invention is the provision of a method for uniting a hardened finished part to a soft workable part to produce an article of manufacture having a finished portion and a portion workable for fitting to the extent necessary to adapt it to the particular use for which it is intended.

A still further object is the provision of a method for producing an article of manufacture comprising a drawn metal shell finished and hardened and subsequently welded into a soft metal part to form an integral member.

Further objects and objects relating to the economies of manufacture and details of the method of construction will appear from the detailed description to follow.

In the usual construction of devices of the character described the body piece is made from a forging and suitable openings are made by removing the stock by machining, which is much more expensive than if the body piece were drawn from sheet metal. The body piece is then subjected to heat treatment and hardened so that the wearing surface will be durable. In this treatment a certain amount of distortion takes place and owing to the hardness the following machining of the surface must be done by grinding, which also adds greatly to the cost of manufacture. It has also been customary to form such devices of sufficiently heavy material to stand the strains produced by heating the part which is to be fitted to the external mechanism in order to soften the same so that it may be subsequently machined after the other portions of the device have been finished and hardened. Devices subjected to this necessarily expensive and delicate operation are seldom true and require considerable working and fitting before they can be properly assembled.

The method herein set forth, however, overcomes all of these difficulties and it is especially adapted to devices of the character described, as typified by the coupling described in my U. S. Patent 1,085,855 of February 3, 1914, which are manufactured as stock parts to be sold in the open market, particularly to automobile manufacturers who fit the shank of the housing to the particular type of drive shaft employed by the manufacturer.

In the method herein set forth the body piece is first drawn to the desired shape from sheet metal of practically uniform thickness, having a flange at one end to give structural stiffness and to provide against excessive warping during the heat treating. The flange also provides means whereby the body piece can be concentrically held in a suitable fixture for carrying out the various steps necessary in manufacturing. The great expense of machining from a solid portion is thereby avoided.

The hub or shank according to my improved method is made from a separate piece of bar stock, as a pressing made from sheet metal would not have sufficient thickness to form a proper hub and provide for broaching or key-seating. If the hub was drawn integral with the body the losses in the pressing operation would be great due to imperfect results, as the metal would crack in a draw of such great length. Besides, various sizes and openings to fit a range of shafts in the hub portion is necessary, which would require very expensive dies to meet these various requirements.

My method provides for machining the hub section from bar stock to the various dimensions required with allowances for finishing thereafter, then attaching this hub by suitable means to the body piece, which has been pressed from the sheet metal. It will be understood, that by this method, heat treating and machining operations can be had to advantage on each piece separately.

The hub or shank is preferably joined with the body piece by welding. I prefer to employ electric welding as this type of welding permits the heat thereof to be confined locally to the part being welded, thus not affecting the heat treatment or temper of the other parts, although, of course, it is to be understood that any form of welding adapted for localized heating may be employed.

Referring particularly to the drawings, which illustrate the different steps of one form of the present method in connection with the manufacture of a universal joint body member, Figure 1 is an end view of the same on line $x-x$ looking to the right in Fig. 2.

Figure 1:
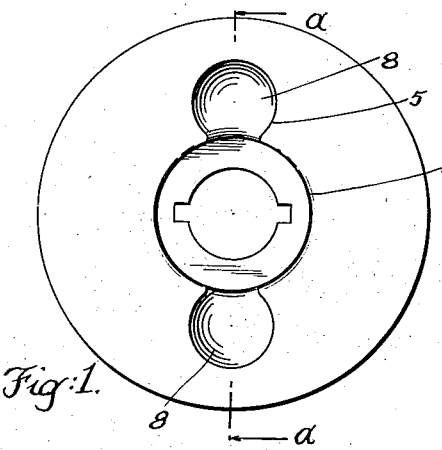

Referring now more particularly to the drawing the shell X is produced by drawing a cup 1 from a sheet of metal. The shell X is then hardened and ground to produce the housing with accurate surfaces as at 4, 5, 6 and 7, Fig. 2. The interior of the cup is cylindrical as is indicated at 4 in Figs. 2 and 8. A pair of cylindrical chambers 8 are provided adjacent the cylindrical portion 4 and the interior of the chamber is indicated by the surfaces 5 in Figs. 2 and 6. In order to provide an accurate plane surface on which the shell X may be set for adjustment the end surface 6 of the rim 9 is accurately ground to substantially a plane surface. The edge 7 of the rim 9 is also formed to accurate dimensions to enable the shell to be accurately centered in a chuck or otherwise which is desirable in making a fitting as will hereinafter be explained. The end 10 of the cylindrical body portion is preferably beveled as at 11. When the shell X has been hardened and the surface ground and formed as above specified the shell represents substantially a finished product.

As has been set forth it is extremely desirable that the shank be of soft workable steel and to this end a collar or shank Y is preferably produced by turning or otherwise to provide relatively heavy body walls through which extends an unfinished shaft opening 14. Preferably the edge of this soft steel shank may be reduced sufficiently to slightly enter the end of the shell (see Fig. 2) as at 15. Adjacent this reduced portion 15 the shank is chamfered as at 16 so that when the collar or shank Y is seated within the end of the shell X a groove 17 is provided adjacent the union of X and Y and preferably this groove is provided with a round bottom wall.

Figure 4:
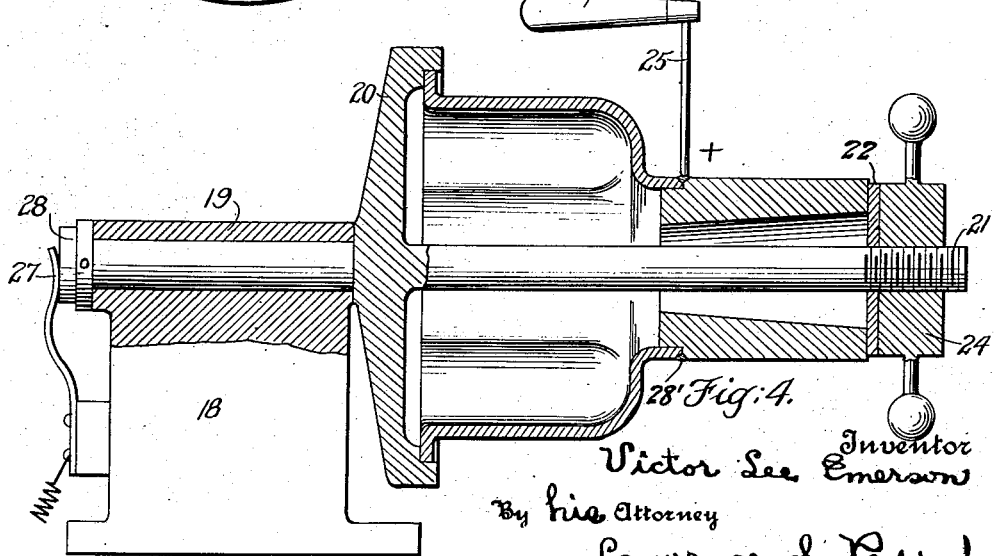
Fig. 4 shows the form of mechanism for centering and rotating the shank and drawn shell during the processes of welding.

Various devices may be utilized to maintain the shank Y in the shell X and I have illustrated one type of device in Fig. 4. This device includes a frame 18 carrying a bearing 19 which supports a face plate 20 from which extends a threaded rod 21 on the outer end of which is provided a clamp washer 22 and hand nut 24. By this construction it will be noted that X and Y may be securely clamped together in such manner as to be rotated when in clamped relation.

In the further carrying out of my process a soft iron pencil 25 may be mounted in a wooden handle 26 or other suitable insulating device. A suitable source of electricity, which may be either a storage battery or an electric dynamo, is suitably connected to the parts X and Y and to the soft iron pencil preferably with the negative end of the circuit connected to the parts X and Y through a brush and contact ring 27, 28 the positive end of the circuit being connected to the pencil. As the soft iron pencil is touched in the bottom of the groove and slightly separated therefrom an electric arc is produced which melts away the soft pencil 25. If the parts X and Y are moved relative to the point of the pencil the melted iron from the pencil will gradually fill the groove 17 and produce a weld as at 38', Figs. 2 and 4, thereby uniting the soft steel shank with the hardened steel shell.

In the modification shown in Figs. 7, 8, 9 and 10 it will be noticed that the circular rolls I' are used in place of balls and the races 8' are squared in cross section in place of circular.

Figure 2:
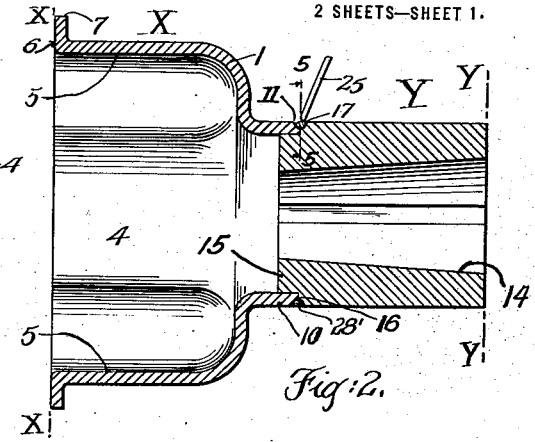
Fig. 2 is a cross section of the body member of the universal joint showing the method of welding taken on line of $a-a$ of Fig. 1.
Figure 3:
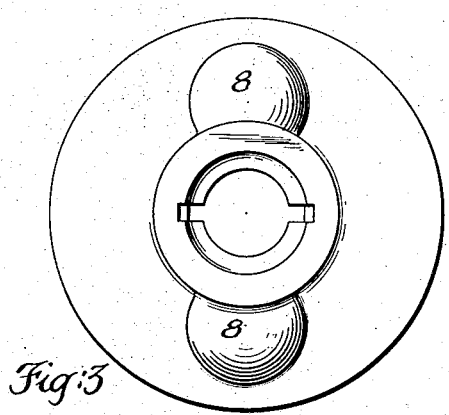
Fig. 3 is an end view of the joint on line $y-y$ looking to the left in Fig. 2.
Figure 5:
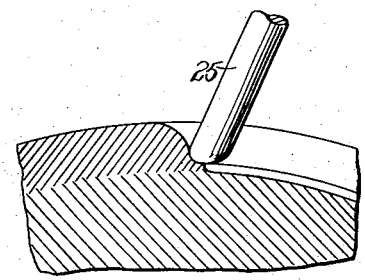
Fig. 5 shows the section of the shell and shank welded and illustrates the electric welding taking place in a circular path.
Figure 8:
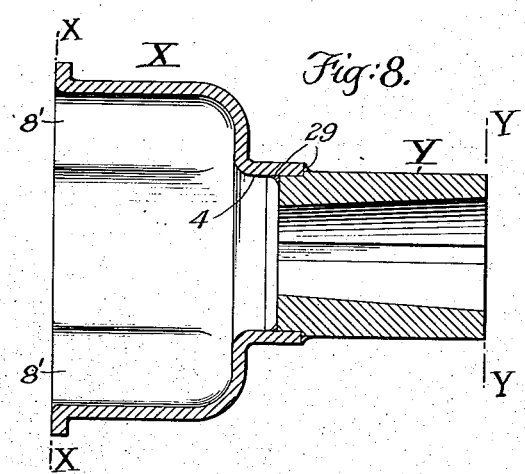
Figure 9:
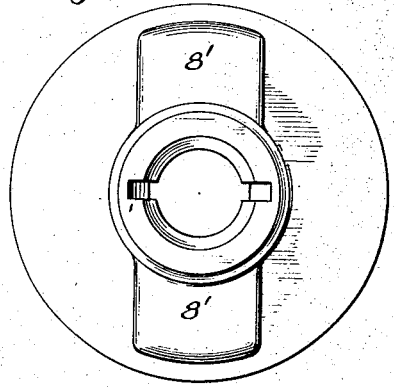
Figure 10:
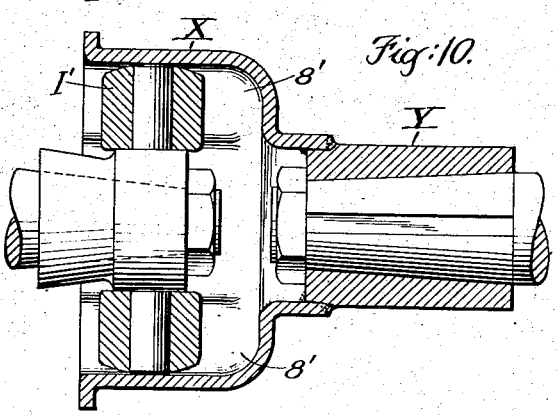

In Fig. 8 there is no groove 17 as in Fig. 2 but the metal is built up against the edge of the shell as shown at 29.

Figure 6:
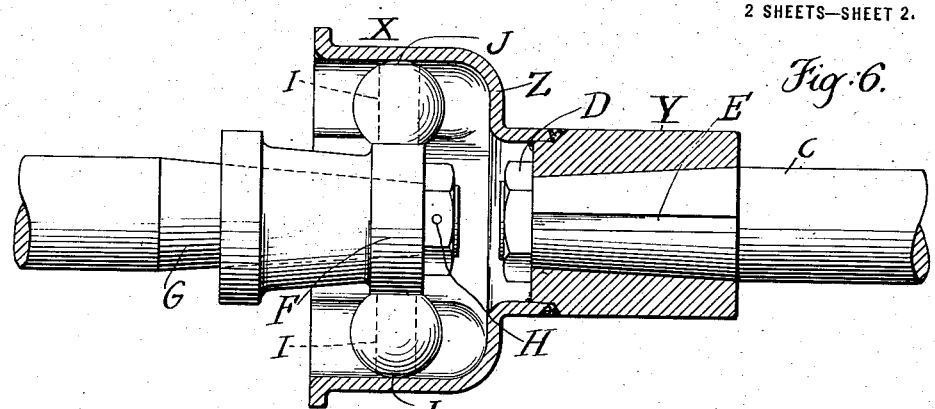
Fig. 6 shows a cross section of the assembled joint.
Figure 7:
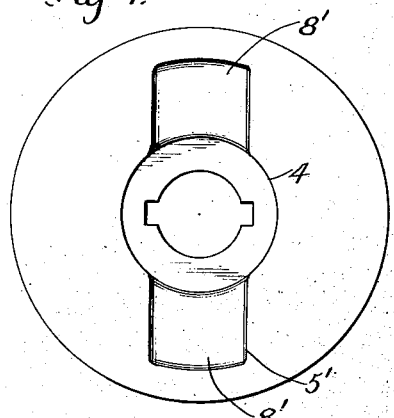
Figs. 7, 8, 9 and 10 show a modification of the universal joint in which circular rolls are used in place of balls and the races are squared in cross section in place of cylindrical. These several views are taken in a similar manner to Figs. 1, 2, 3 and 6.

To give a full understanding of the practical use of the specified article of manufacture herein referred to, reference will be made to Fig. 6. The completed housing Z is illustrated as being secured upon a shaft C by means of a nut D, and a suitable key inserted in the key way E. This housing incloses a head F mounted upon a shaft G and secured by means of a pinned nut H. The head F carries on the shafts I anti-friction balls J which are construct; d to accurately fit the cylindrical chambers 8 previously referred to.

By this method it will be seen that a strong and light structure is produced at a greatly reduced cost and saving in equipment. As only the wearing parts are hardened, leaving the remaining portions capable of machining, all distortion, due to subsequent heat treatment for the purpose of fitting, is overcome as is all danger of fracture where the body is united to the shaft, which danger is present when a hardened body is mounted upon or keyed to a shaft. It is, of course, to be understood that wherever the word "iron" is used in connection with the present specification, it is used generically to include a metal or composite metal of iron or its alloys.

It is also understood that the particular embodiment of my invention herein disclosed is, of course, susceptible of considerable variation without departing from the spirit thereof, and it is to be understood that many changes might be made by those skilled in the art within the scope of the invention as defined in the appended claims.

What I claim is:

1. The method of manufacturing a machine element which consists in drawing a shell from sheet metal, machining a part from bar stock, fitting said shell and part to each other in proper alinement and uniting said shell and machined part.

2. The method of manufacturing a machine element which consists in drawing a shell from sheet metal and forming a flange at one end thereof, forming an opening at the other end of said shell, machining a part from bar stock, fitting said machined part within said opening, and uniting the drawn shell and machined part at their junction.

3. The method of manufacturing a machine element which consists in drawing a shell from sheet metal, forming a flange at one end thereof and an opening at the other end, machining said flange to true radial and end surfaces, centering said shell by said machined surfaces in a rotatable member, fitting a machined part of bar stock in said opening, and welding said shell and machined part at their junction by an application of localized welding in a circular path as said shell and machined part are rotated.

4. The method of forming a machine element which comprises drawing a shell from sheet metal, hardening said shell, grinding said shell to predetermined dimensions to constitute a finished part, turning a shank of relatively soft material; fitting said shank within one end of said shell; then welding said finished part and shank together.

5. The method of producing an article of manufacture which comprises drawing a shell from metal capable of being hardened; hardening said shell; then grinding said shell to produce work surfaces of predetermined dimensions; then turning a relatively heavy shank of comparatively soft workable metal; then fitting said shank to said shell in such manner as to provide a groove having a round bottom surface adjacent the union of the parts and then filling said groove with molten metal to unite said parts.

6. The method of producing an article of manufacture having a finished portion and an unfinished portion adaptable for fitting which comprises drawing a shell from a portion of a steel plate; hardening the drawn steel shell; grinding the hardened shell to form work surfaces of predetermined dimensions; providing a soft steel shank adaptable to fit said shell; fitting said shank to said shell, then uniting said shell to said shank by localized welding.

7. The method of producing an article of manufacture comprising drawing a shell from a steel plate; hardening the drawn steel shell; grinding said shell to predetermined dimensions to provide work surfaces; producing a shank of soft steel adapted to fit said shell; setting said shank within said shell in such a manner as to provide a groove, one wall of which comprises substantially the end of the shell; and welding said shell to said shank by filling said groove with molten iron.

8. The method of producing a universal joint body member which comprises the fitting of a hardened steel shell to a part of soft steel adapted for subsequent machining, and welding the said parts together by depositing molten metal at their juncture.

In testimony whereof I have signed my name to this specification in the presence of two subscribing witnesses, this 29th day of March, 1917.

VICTOR LEE EMERSON.

Witnesses:
M. M. AMMON,
SAMUEL M. LUNT.